United States Patent [19]

Jones

[11] Patent Number: 4,569,844

[45] Date of Patent: Feb. 11, 1986

[54] MICROENCAPSULATION PROCESS, MICROCAPSULES AND USE THEREOF

[75] Inventor: David A. Jones, Anglesey, Wales

[73] Assignee: Mars, Inc., McLean, Va.

[21] Appl. No.: 570,436

[22] Filed: Jan. 16, 1984

Related U.S. Application Data

[63] Continuation of Ser. No. 103,394, Dec. 13, 1979, abandoned.

[30] Foreign Application Priority Data

Dec. 19, 1978 [GB] United Kingdom ............... 49034/78
Oct. 24, 1979 [GB] United Kingdom ................ 7936873

[51] Int. Cl.$^4$ ........................ A01K 61/00; A23L 1/31; B01J 13/02
[52] U.S. Cl. ........................................ 426/2; 264/4.3; 264/4.7; 424/36; 426/92; 426/534; 426/805; 428/402.21
[58] Field of Search .................................. 264/4.7, 4.3; 428/402.21; 424/36; 426/92, 534, 805, 2

[56] References Cited

U.S. PATENT DOCUMENTS

| | | | |
|---|---|---|---|
| 3,323,922 | 6/1967 | Durst | 426/98 X |
| 3,577,515 | 5/1971 | Vandegaer | 264/4.7 X |
| 3,796,669 | 3/1974 | Kiritani et al. | 264/4.7 X |

FOREIGN PATENT DOCUMENTS

| | | | |
|---|---|---|---|
| 47-1763 | 1/1972 | Japan . | |
| 1091078 | 11/1967 | United Kingdom | 264/4.7 |

OTHER PUBLICATIONS

Chang et al., Canadian Journal of Physiology and Pharmacology, 44, 115–128, (1966).
Jones et al., Nature, 247, 233–235, (Jan. 25, 1974), [Q IN2].
Jones et al., Chap. 6 of "Microencapsulation", J. R. Nixon, Marcel Dekker Inc., New York, (1976), [RS 201.C3.I57 1974].
Watanabe et al., Chap. 2 of "Microencapsulation", J. R. Nixon, Marcel Dekker, Inc., New York, (1976), [RS 201.C3.I57 1974].
Meyers, Feedstuffs, 43,27 (Jul. 10, 1971), [SF95.A1 F4].
Meyers et al., The American Fish Farmer, Jul. 1971, pp. 15, 16, 18 & 20.
Mackinney, SPE Transactions, p. 71, (Jan. 1963).
Chemical and Engineering News, 12, 16 & 17, (1974), [TP1 I 418].
Feedstuffs, 45, 35, (Apr. 16, 1973), [SF 95.A1 F4].

*Primary Examiner*—Richard D. Lovering
*Attorney, Agent, or Firm*—Curtis, Morris & Safford

[57] ABSTRACT

What is disclosed is a process for the production of microcapsules by forming an emulsion of an aqueous solution of a compound having free amino groups in a liquid which is substantially non-polar or which has a polarity less than that of a 4:1 w/w mixture of cyclohexane and chloroform as the continuous phase, and adding a solution of a compound capable of polymerizing with the compound in the aqueous solution so that an interfacial polymerization reaction occurs.

19 Claims, No Drawings

MICROENCAPSULATION PROCESS, MICROCAPSULES AND USE THEREOF

This application is a continuation of application Ser. No. 103,394 filed Dec. 13, 1979 and now abandoned.

The present invention relates to microencapsulation processes and more especially to processes for encapsulating fine droplets of a hydrophilic liquid in a hydrophobic continuous phase.

It has been proposed in the prior art to produce microcapsules containing aqueous amine solutions by emulsifying the aqueous solution in an organic liquid with the aid of a suitable surfactant and forming a polymer membrane around the droplets by interfacial polymerisation. For example, it has been proposed to add sebacoyl chloride to the continuous phase to produce a polyamide membrane or to add a polyisocyanate to the continuous phase to produce a polyurethane membrane. Once the microcapsules have been produced it is frequently desirable to change the continuous phase from a hydrophobic liquid to a hydrophilic liquid, especially water. This is normally effected by decanting or centrifuging off the majority of the hydrophobic liquid, and washing and redispersing the microcapsules several times in a hydrophilic liquid containing large amounts of surfactant.

In the processes proposed in the prior art, certain precautions have to be taken to avoid aggregation of microcapsules, especially at the phase-change stage of the process where the capsules are close together and, for instance, free acid chloride groups in the polymer membrane of one capsule may condense with, for instance, residual free amino groups in the polymer membrane of a second capsule thereby forming chemical bonds between the capsules.

According to the prior art, it is necessary to use low temperatures of the order of 0° C. (the reaction is normally carried out in an ice bath) in the microencapsulation stage, to add the acid chloride quickly and to control the reaction time within close limits and, at the phase change stage, to effect the change, which terminates polymerisation, as quickly as possible after the polymerisation reaction has proceeded to the desired extent.

For many uses of the microcapsules, it is essential to remove the phase-change surfactant completely after the capsules are capable of satisfactory suspension in water. Complete removal is exceptionally difficult and generally involves many hours of repetitive washing.

Heretofore, the prior art has also believed it to be essential to use as the hydrophobic phase a solvent having a degree of polarity such that a minor amount of the amine compound diffuses from the emulsified droplets to become available for reaction with, for example, an acid chloride to form the polymer membrane. Thus, for example, in interfacial polymerisation reactions in which a proteinaceous amine component is polymerised by reaction with sebacoyl chloride, the solvent used for the hydrophobic phase (and in which the sebacoyl chloride is conveniently introduced into the emulsion) is usually a mixture of cyclohexane and chloroform in a weight ratio of 3:1 to 4:1 or a solvent of similar polarity that has slight degree of solvent power for the amine component.

It has frequently been found when operating in this manner that the walls of the microcapsules are thick, rough, and brittle, which makes them difficult to clean of solvent and results in poor yields of capsules. This effect is particularly noticeable when a protein-rich amine component is used.

The present invention is based on the unexpected observation that it is possible to initiate an interfacial polymerisation reaction actually at the interface of a hydrophilic and a hydrophobic phase without any substantial diffusion of the amine component into the hydrophobic phase.

The present invention provides a process for the production of microcapsules containing an aqueous solution of a compound containing a plurality of free amine groups, and especially containing an aqueous protein solution, which comprises forming an emulsion of the aqueous amine solution as disperse phase in a substantially non-polar solvent as the continuous phase and adding to the emulsion a solution of a compound containing a plurality of groups capable of reacting with amine groups to form a polymer, especially to form a polyamide.

As examples of substantially non-polar solvents, there may be mentioned cyclohexane, n-decane, 40/60 petroleum ether, and other solvents of similar lack of polarity. Cyclohexane alone provides an ideal carrier for acid chlorides such as sebacoyl and adipoyl chloride. It also prevents rapid diffusion of diamines from the aqueous phase during the primary emulsion stage. It may also be necessary when using certain reactants such as succinic anhydride, which are not soluble in, for example, pure cyclohexane, to use a mixed solvent having a polar component in which the reactant is soluble. In such cases, the kind and amount of polar solvent present in the mixture will be such that the continuous phase solvent has a polarity less than a 4:1 w/w mixture of cyclohexane and chloroform.

The use of a substantially non-polar solvent, such as cyclohexane alone, as the continuous phase restricts the diffusion of amine and enables capsules with strong smooth walls to be made over a wide range of temperature and rate of addition, concentration and nature of reactants.

It appears that the polymerisation reaction is initiated at the interface between the aqueous and the continuous solvent phases, but because diffusion of diamine is severely restricted by the low affinity of the substantially non-polar solvent for this group of substances, polymerisation proceeds in the aqueous phase. This results in a smooth outer capsule surface from which solvent may readily be removed. In addition it is theorised that, because sebacoyl and other acid chlorides have low permeability in water, polymerisation is more localised at the interface and is controlled by the diffusion of diamine within the aqueous phase inside the capsule. Thus the wall cross-linking is confined to a narrow zone, resulting in a stronger and less brittle structure.

The compound containing free amine groups may be, for example, hexamethylenediamine, lysine, or a hydrophilic, i.e. water soluble or water dispersible protein containing free amine groups, or a mixture of such compounds, or any of the amino compounds disclosed in the art for use in interfacial polymerisation reactions. When the material to be encapsulated is a foodstuff or a foodstuff ingredient such as a flavor system, or is a pharmaceutical, it is desirable that the membrane should be biodegradable in the mouth or stomach to allow the contents of the microcapsules to be released. To this end it is desirable that at least a part of the compound containing free amine groups be a compound, such as a protein, that is hydrolyzable so that the polymeric chains forming the membrane are broken and the membrane disintegrates.

The protein used as the compound containing free amine groups should, of course, be capable of forming a sufficiently stable aqueous phase to allow the aqueous phase to be emulsified in the non-polar solvent. To this end the protein must be hydrophilic, that is to say, water-soluble or water-dispersible. Also, in order to obtain a satisfactory cross-linked structure round the emulsion droplets, the protein molecules in the emulsified aqueous phase should lie along the surface of the droplets and therefore it is preferred that the proteins should not be purely globular proteins in which the molecules are spherical. It is possible to use in the inventive process proteins having a substantially linear structure i.e. proteins having one or more substantially linear fragments with attached globular protein fragments provided that sufficient free amine groups are available in each molecule for reaction. Although unprocessed globular proteins per se are preferably not used in the process of the invention they may be used in conjunction or admixture with substantially linear proteins but in this case they will normally play little or no part in the wall-forming reactions. It is possible and often desirable to use in the process modified globular proteins that have been denatured or degraded to breakdown, at least partially, the tertiary amine structure, thereby causing a breakdown in the globular structure resulting in elongation of the molecule by providing linear fragments and providing free amine groups for reaction.

The proteins used in the inventive process are preferably naturally occurring proteins rather than synthesised protein-type materials since in general the natural proteins are more readily broken down by enzymatic activity or other biodegradation processes and the fractions thereof are normally tolerated by living animals, whereas synthesised protein-type materials are frequently not biodegradable or broken down to give toxic or other harmful or indigestable fragments.

In order that the protein shall contain free amine groups for reaction with the second compound the protein should contain a relatively high proportion of amino acids containing two amine groups, especially lysine, arginine or histidine, or contain aspartic acid or glutamic acid in the form of their amides, i.e. asparagine or glutamine.

It is not essential that protein materials used in the reaction should be composed of pure protein and in fact it is frequently desirable if the protein is used in the form of a component of a complex naturally occurring mixture of materials. As examples of such mixtures there may be mentioned egg, egg yolk, fish roes, such as cod roes, and certain forms of denatured whey.

Examples of proteins that can be used in the process of the invention, which fulfil the requirements of being hydrophilic and substantially linear or which can be treated to make them hydrophilic substantially linear, are hemoglobin, protamines such as salmin, histones such as liver histone, globulin and beta-lactoglobulin, albumins such as alphalactalbumin, ovalbumin or serum albumin, glutelins, which preferably have been degraded, and solubilized scleroproteins. As is indicated hereinbefore the protein may be used as such or as a component of a complex mixture containing the protein.

As examples of hydrophilic proteins or mixtures containing hydrophilic proteins whole egg, egg yolk, hemoglobin, full cream condensed milk, denatured whey materials and homogenized cod roe, may be mentioned. Any hydrophilic proteins with sufficient reactive $NH_2$ groups can be used in the formation of capsule wall. Aqueous protein solutions and dispersions having a concentration of protein of 20% by weight and above are effective for use in the process. As indicated hereinbefore protein material which is not suitable for the wall forming reaction may be included in the aqueous phase to be encapsulated but in general such proteins will not take part in the reaction to form the capsule wall.

When an edible protein is encapsulated according to the present invention, thus readily to produce biodegradable edible microcapsules, the microcapsules have particular utility as a food for sustaining aquatic animal life, such as fish or crustacea or their larvae, for dispersal in water containing the animals to be fed.

As the compound containing amine-reactive groups, the acid chloride or anhydride of a di- or poly-basic carboxylic acid, preferably of a $C_4$ to $C_{14}$ dicarboxylic acid, such as the chloride of sebacic acid, adipic acid, phthalic acid, terephthalic acid, or succinic acid, or a tricarboxylic acid such as citric acid, is preferably used. Succinic anhydrides may be given as an example of a suitable acid anhydride.

The size of the microcapsules can be varied over a wide range, depending on their ultimate use, by varying the size of the dispersed droplets of amine-containing aqueous phase. Thus, capsules of a diameter between about 10 microns and about 500 microns can be prepared as desired, by controlling the degree of dispersion of the aqueous phase.

The use of a surfactant is useful in regulating the size of capsules during emulsion formation and also has an effect on the rate of wall formation, presumable because it assists contact between the aqueous and solvent phase. Most suitable surfactants include sulfonated alkyl phenols, such as those sold under the tradename "Span 85", lecithin, and the lactic acid glyceride ester commercially available under the tradename "Lactodan". A surfactant is not essential in the present process, however, and may be omitted.

For the phase change operation, the capsules are allowed to settle and excess suspending phase is decanted off. The capsules may then be washed with fresh organic liquid, especially cyclohexane, to remove traces of surfactant, may be separated from the solvent, for example by settling or centrifugation, and then redispersed in a hydrophilic liquid such as water.

During the phase change operation, it is usually necessary to have present a material with surface activity to aid dispersion of the capsules into the hydrophilic, e.g. aqueous, phase. When the capsules are intended for human or animal use this surfactant is preferably not a detergent, as has previously been thought necessary, because the detergent eventually has to be removed. Rather, the surface active material may be, for example, a protective colloid such as polyvinyl alcohol or gelatine, or a material such as lecithin, or an ester of a glyceride, such as a lactic acid ester of a monoglyceride. It has been found that such materials are either easily removable or do not need to be removed. Also, to avoid capsule rupture during the phase change operation and afterwards, it is frequently desirable to balance osmotic pressure by adding a solute to the suspending phase. This may be achieved by using high surfactant levels or, in the absence of surfactant, by adding suitable amounts of inorganic solutes thereto.

The process of the invention is virtually temperature independent and has successfully been carried out over a range of temperatures up to 40° C. While the low temperatures commonly used in the prior art can also be used with the present process, it evidently is most convenient to work at room temperature. Polymerisation proceeds more rapidly at higher temperatures, but because the end point of reaction is generally determined by the non-availability of reactants, there is little advantage in the use of higher temperatures.

The process of the invention has a number of advantages over prior art processes for the microencapsulation of various materials in aqueous solutions. Among these advantages are:

(a) a wide variety of proteinaceous materials may be encapsulated or used in the formation of the capsules without the need for precise temperature determination and control or precise acid chloride concentration and addition rates;

(b) the concentration of polymerisation in the interface area between phases produces a wall which is sufficiently strong to withstand drying;

(c) the process enables both short-chain highly reactive diamines and chloroform to be excluded from the reaction-both are potentially toxic;

(d) the absence of short-chain diamines enables the formation, by pure protein cross-linking, of walls which are subject to enzyme digestion in the stomach;

(e) the capsules after washing may be dried and satisfactorily rehydrated without agglomeration, thus allowing indefinite storage and reduction in bulk;

(f) the capsules are stable for up to 6 months, or even longer, in fresh water, saline solution and in natural seawater for up to 9 days;

(g) whereas in prior art processes large amounts of the continuous or suspending phase were often required, for example as much as a 12:1 ratio by volume to the discontinuous or suspended phase, this ratio can be reduced to as little as 6:1 using the present invention, for example when the suspending phase is pure cyclohexane.

Although the invention has generally been described with reference only to encapsulation by interfacial polymerization involving the formation of a polyamide, it will be appreciated that other condensation polymerization reactions, for example polyurea-forming reactions, will occur at the interface between the two phases of an emulsion and that the process of the invention is equally applicable to such polymerization process. For a polyurea-forming reaction, a mixture of diisocyanate and a catalyst such as an alkanolamine, for example dimethylethanolamine, is useful as the amine-reactive component. The catalyst will normally be included in the aqueous phase.

A better understanding of the present invention and of its many advantages will be had by referring to the following specific examples, given by way of illustration. Unless stated otherwise, all parts quoted in the examples are parts by volume and all percentages are percentages by weight.

EXAMPLE 1

5 parts of a 30% by weight aqueous solution of spray dried whole egg were emulsified in 25 parts of cyclohexane to which 2% by weight of lecithin were added.

The emulsion was formed by using a 2-blade propeller, the emulsification time being 4 minutes and the resulting emulsion consisting of droplets 50 to 100 microns in diameter.

0.15 part of adipoyl chloride in 10 parts of cyclohexane were added steadily to the emulsion over a period of 10 seconds. Reaction was continued for 10 minutes at 23.5° C.

The microcapsules formed were allowed to settle and the cyclohexane was decanted off. The capsules were then washed twice with 25 parts of cyclohexane and finally with 25 parts of cyclohexane containing 0.25 parts of lecithin. After a final settling, which took about 3 minutes, all the cyclohexane was decanted. The capsules were taken up in 50 parts of a 15% w/w warm aqueous gelatin solution and rapidly agitated for 2 to 3 minutes. 750 parts of water at approximately 35° C. were then added, while still agitating.

Pale yellow non-agglomerated capsules between 50 and 100 microns in diameter were obtained.

The capsules were separated from the water on a nylon screen and dried overnight after washing with water to remove excess gelatin. The dried capsules could be rehydrated simply by agitating them in hot water.

EXAMPLE 2

5 parts of a 20% aqueous bovine hemoglobin solution containing 0.015 part of dimethyl ethanolamine were emulsified in 25 parts of cyclohexane containing 1 part of "Span 85" using a 4-blade impeller, the emulsification time being 5 minutes and the resulting emulsion consisting of droplets 5 to 100 microns in diameter.

10 parts of cyclohexane containing 0.5 part of diphenylmethane-4,4'-diisocyanate were added steadily over a period of 20 seconds and reaction was continued for 7 minutes at a temperature of 17° C.

The microcapsules were allowed to settle and the cyclohexane was decanted off. The capsules were then washed twice with 25 parts of cyclohexane.

After final settling and decanting off of the solvent, the capsules were taken up in 50 parts of a 15% w/w warm aqueous gelatin solution and rapidly agitated for 2 to 3 minutes. 300 parts of water at approximately 35° C. were then added while continuing the agitation.

Excellent reddish capsules were obtained both before and after drying.

EXAMPLES 3 to 17

The procedure of Example 1 was generally followed using a variety of reactants and reaction conditions as indicated in the following Table. In each case excellent capsules were obtained which could be dried and rehydrated.

| Example No. | Amine | Solvent | Surfactant | Emulsification | Acid | Reaction Time/T°C. (mins) | Wash | Take up | Dilution |
| --- | --- | --- | --- | --- | --- | --- | --- | --- | --- |
| 3 | Hb 3 parts 20% | Cyclohex 25 parts | Span 85 8% | 4 blade 6 min. 100–300μ | Seb. cl. 0.15 in 10 cyclohex | 8/17 | 2 × 15 cyclohex | 50 pt. 15% gelatin | 12:1 |

-continued

| Example No. | Amine | Solvent | Surfactant | Emulsification | Acid | Reaction Time/T°C. (mins) | Wash | Take up | Dilution |
|---|---|---|---|---|---|---|---|---|---|
| 4 | Hb 5 parts 30% | Cyclohex 25 parts | Span 85 8% | 2 blade 15 min. 10–500μ | Seb. cl. 0.15 in 10 cyclohex | 10/26.5 | 3 × 12.5 cyclohex | 50 pt. 15% gelatin | 10:1 |
| 5 | Hb 5 parts 20% | Cyclohex 25 parts | Span 85 8% | 4 blade 10 min. 50–150μ | Seb. cl. 0.15 in cyclohex | 10/40 | 1 × 25 1 × 50 cyclohex + 0.5% Span 85 | 25 pt. 15% gelatin | 12:1 |
| 6 | Hb 5 parts 20% | Cyclohex 25 parts | Lecithin 1% | 2 blade 15 min. 50–150μ | Seb. cl. 0.15 in 10 cyclohex | 10/26 | 3 × 12.5 cyclohex | 50 pt. 15% gelatin | 2:1 |
| 7 | Hb 5 parts 20% | Cyclohex 25 parts | Lecithin 0.5% | 2 blade 15 min. 100–200μ | Add. cl. 0.05 in 10 cyclohex | 4/27 | 3 × 12.5 cyclohex | 50 pt. 15% gelatin | 4:1 |
| 8 | Hb 5 parts 20% | Cyclohex 25 parts | Lecithin 0.5% | 2 blade 5 min. 150–300μ | Succ. cl. 0.15 in 10 cyclohex | 13/24 | 3 × 12.5 cyclohex | 50 pt. 15% gelatin | 4:1 |
| 9 | Hb 5 parts 20% | Cyclohex 25 parts | Lecithin 0.5% | 4 blade 15 min. 100–300μ | Tereph cl. .075 in 10 cyclohex | 15/23.5 | 2 × 12.5 cyclohex | 50 pt. 15% gelatin | 4:1 |
| 10 | Hb 5 parts 20% | Cyclohex 25 parts | Lactadan LR 0.2% | 4 blade 8 min. 50–100μ | Succ. cl. | 4/23 | 1 × 25 cyclohex 1 × 25 cyclohex + 0.5% Lecithin | 50 pt. 15% gelatin | 20:1 |
| 11 | Hb 5 parts 20% | Cyclohex 25 parts | Span 85 4% | 4 blade 5 min. 50–150μ | Succ. Anh. 0.125 in 5 cyclohex + 5 Chl. | 15/18 | 2 × 25 cyclohex | 50 pt. 15% gelatin | 6:1 |
| 12 | Hb whole egg (3:1) 5 part 20% | Cyclohex 25 parts | Span 85 4% | 2 blade 15 min. 50–150μ | Seb. cl. 0.15 in 10 cyclohex | 15/28 | 4 × 12.5 cyclohex | 50 pt. 5% gelatin | 4:1 |
| 13 | whole egg 5 part 30% | Cyclohex 25 parts | Lecithin 2% | 2 blade 5 min. 30–100μ | Seb. cl. 0.15 in 10 cyclohex | 12/23.5 | 2 × 25 cyclohex 1 × 25 cyclohex + 0.5% Lecithin | 50 pt. 15% gelatin | 20:1 |
| 14 | whole egg 5 part 30% | cyclohex 25 parts | Lecithin 2% | 2 blade 6 min. 30–100μ | Succ. cl 0.15 in 10 cyclohex | 8/23.5 | 2 × 25 cyclohex 1 × 25 cyclohex + 0.5% Lecithin | 50 pt. 15% gelatin | 4:1 |
| 15 | Hb 5 part 20% | cyclohex 25 parts | Lecithin 0.5 | 4 blade 15 min. 50–150μ | Succ. cl. 0.25 in 10 cyclohex | 15/23.5 | Cyclohex decanted to leave 25 parts; poured in to 250 parts 20% aqueous NaCl | | |
| 16 | Hb 5 part 20% | 40/60 pet. ether 25 parts | Span. 85 4% | 4 blade 2 min. 50–150μ | Succ. Cl. 0.1 in 10 Pet. ether | 5/19 | 1 × 25 pet. ether + 2% span | 50 pt. 15% gelatin | 6:1 |
| 17 | Full cream condensed milk 5 part 66% | n-decane 25 part | Span 85 4% | 4 blade 2 min. 50–150μ | Succ. cl. 0.1 in 10 decane | 3/19 | 2 × 25 decane + 2% span | 50 pt. 15% gelatin | 6:1 |

Hb = bovine haemoglobin
Cyclohex = cyclohexane
Seb. cl. = Sebacoyl Chloride
Add Cl. = Adipoyl chloride
Succ. Cl. = Succinoyl chloride
Tereph. Cl. = Terephthaloyl Chloride
Succ. Anh. = Succinic Anhydride
Chl. = Chloroform

EXAMPLE 18

100 grams of frozen cod roe were defrosted and homogenized using a tube and plunger. The resultant mixture was passed through a 0.5 mm nylon mesh sieve and mixed with 5 mls of glycerol. The total weight of material recovered was 63 grams. This was placed in a 500 ml beaker, 250 ml of cyclohexane and 0.5% of egg lecithin was added and the mixture was homogenized by using a high speed stirrer for 10 minutes to produce an emulsion having a droplet size of 50–150μ. 1.5 grams of succinoyl chloride in 80 ml of cyclohexane was added and the reaction was continued for 8 minutes. The capsules were allowed to settle and the cyclohexane was decanted off. The capsules were then washed four times each with 50 ml of cyclohexane and then further treatment was continued as in Example 1.

I claim:
1. A method for making microcapsules containing an aqueous solution of a hydrophilic protein having a plurality of free amine groups, which method comprises forming an emulsion of said aqueous solution as the disperse phase in a liquid hydrocarbon which is a non-solvent for the protein and which is substantially non- polar or which has a polarity less than that of a 4:1 w/w mixture of cyclohexane and chloroform as the continuous phase, and adding to the resulting emulsion a solution of a compound selected from the group consisting of di- and poly-basic carboxylic acids, and anhydrides and chlorides of such acids, capable of reacting with amine groups to form a polymer, whereby an interfacial condensation polymerization reaction occurs between the protein and said compound to form microcapsules with a wall consisting substantially completely of cross-linked protein, the ratio of the continuous phase to said disperse phase being less than 12:1 to as little as 6:1 and said interfacial polymerization reaction occurring in at most 15 minutes at a temperature from room temperature up to 40° C.

2. A method as in claim 1 wherein the protein is a protein having a substantially linear structure.

3. A method as in claim 1 wherein the protein is a globular protein and has been modified to break-down, at least partially, the tertiary amine structure thereof.

4. A method as in claim 1 wherein the protein is a naturally occurring protein.

5. A method as claimed in claim 1 wherein the protein contains a relatively high proportion of amino acids containing two amine groups or contains at least some amino acids in the form of their amides.

6. A method as in claim 1 wherein the protein is present in the form of a component of a complex naturally occurring mixture of materials.

7. A method as in claim 6 wherein the mixture is whole egg, egg yolk, hemoglobin, or full cream condensed milk.

8. A method as in claim 1 wherein the aqueous solution contains another, different, polyamine admixed with said protein.

9. A method as in claim 1 wherein the aqueous protein solution has a concentration of at least 20% by weight.

10. A method as in claim 1 wherein said compound is sebacoyl chloride, adipoyl chloride, succinoyl chloride, terephthaloyl chloride, or succinic anhydride.

11. A method as in claim 1 wherein the liquid of the continuous phase is cyclohexane, n-decane, or 40/60 petroleum ether.

12. A method as in claim 1 wherein, after termination of the reaction, the capsules are separated from the continuous phase and dispersed in water.

13. A method as in claim 12 wherein a nondetergent surface active agent is present to assist the dispersion in water.

14. A method as in claim 13 wherein said surface active agent is a protective colloid.

15. A method as in claim 14 wherein said protective colloid is polyvinyl alcohol or gelatin.

16. A method as in claim 13 wherein said surface active agent is lecithin or an ester of a glyceride.

17. A method as in claim 12 wherein a solute is present in said water in sufficient amount to balance the osmotic pressure inside and outside the capsules.

18. Biodegradable edible microcapsules prepared by the method of claim 1.

19. A method for cultivating marine animal life which comprises feeding to said animal life biodegradable edible microcapsules as in claim 18.

* * * * *